US00RE40015E

(19) United States
(12) Reissued Patent
Belliveau

(10) Patent Number: US RE40,015 E
(45) **Date of Reissued Patent: *Jan. 22, 2008**

(54) LIGHTING DEVICE WITH BEAM ALTERING MECHANISM INCORPORATING A PLURALITY OF LIGHT SOURCES

(76) Inventor: Richard S. Belliveau, 10643 Floral Park, Austin, TX (US) 78759

( * ) Notice: This patent is subject to a terminal disclaimer.

(21) Appl. No.: 10/456,226

(22) Filed: Jun. 6, 2003

Related U.S. Patent Documents

Reissue of:
(64) Patent No.: 6,474,837
Issued: Nov. 5, 2002
Appl. No.: 09/716,713
Filed: Nov. 20, 2000

(51) Int. Cl.
*F21V 17/02* (2006.01)
F21V 33/00

(52) U.S. Cl. ..... 362/231; 362/282; 362/319; 362/232

(58) Field of Classification Search ..... 362/231, 362/282, 319, 232, 242, 287, 35, 285
See application file for complete search history.

(56) References Cited

U.S. PATENT DOCUMENTS 4,048,631 A * 9/1977 Flores ..... 340/321
4,314,317 A * 2/1982 Robson ..... 362/189
4,697,890 A * 10/1987 Crookston ..... 350/407
4,745,526 A * 5/1988 Sestak ..... 362/35
4,964,023 A * 10/1990 Nishizawa et al. ..... 362/100
5,014,171 A * 5/1991 Price, III ..... 362/277
5,158,357 A * 10/1992 McDermott ..... 362/204
5,165,781 A * 11/1992 Orak ..... 362/186
5,224,774 A * 7/1993 Valle et al. ..... 366/2
5,504,661 A * 4/1996 Szpak ..... 362/30
5,657,293 A * 8/1997 Merritt et al. ..... 365/233.5
5,893,626 A * 4/1999 Poling ..... 362/35
6,033,087 A * 3/2000 Shozo et al. ..... 362/244
6,048,080 A * 4/2000 Belliveau ..... 362/282
6,055,006 A * 4/2000 Murano ..... 347/118
6,095,661 A * 8/2000 Lebens et al. ..... 362/184
6,267,478 B1 * 7/2001 Chen ..... 353/84
6,357,893 B1 * 3/2002 Belliveau ..... 362/285
6,379,025 B1 * 4/2002 Mateescu et al. ..... 362/293
6,474,837 B1 * 11/2002 Belliveau ..... 362/231

* cited by examiner

*Primary Examiner*—Sandra O'Shea
*Assistant Examiner*—Anabel Ton
(74) *Attorney, Agent, or Firm*—Walter J. Tencza, Jr.

(57) ABSTRACT

An apparatus is disclosed incorporating a plurality of light sources, such as a plurality of lighting emitting diodes, and a beam altering mechanism for altering the light projected by the plurality of light sources. Several mechanisms for altering the beam produced by the plurality of light emitting diodes are disclosed. The present invention can be used in for example hand held flashlights and theatrical lighting. The present invention in one embodiment discloses a hand held flashlight incorporating a plurality of light sources and a beam altering mechanism capable of changing the color of the emitted light beam produced by the flashlight. The beam altering mechanism may be comprised of an aperture device, which may be an aperture plate, provided with a plurality of apertures that are strategically aligned with the individual light beams emitted from each of the plurality of light sources. In one embodiment additional apertures containing color modifying filters may also be strategically placed in the aperture device and these modifying filters can be aligned over each of the light sources by rotation of the aperture device. The aperture device may be round and may be mounted centrally to a substrate on which the plurality of light sources are mounted. The plurality of light sources can be arranged symmetrically to provide uniform illumination. The aperture device can be arranged with a plurality of apertures that contain light refractive optics that are strategically placed in the aperture device and provide a means for changing the focus of the overall beam produced by for example a flashlight. The plurality of light sources and the aperture device may be incorporated into a remote controlled lighting device.

51 Claims, 12 Drawing Sheets

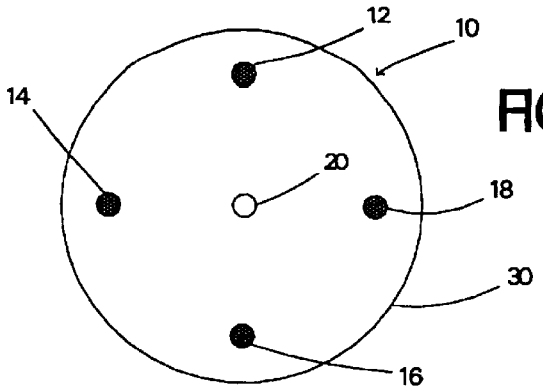
FIG 1A
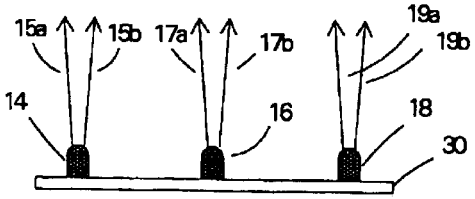
FIG 1B
FIG 1C
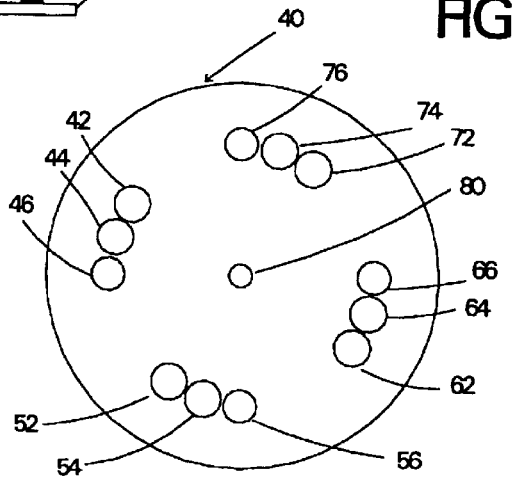

FIG 10A
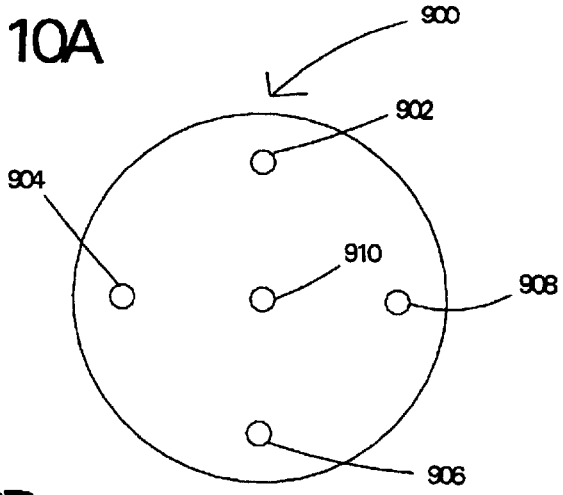
FIG 10B
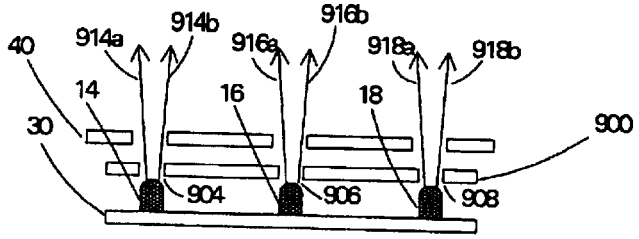
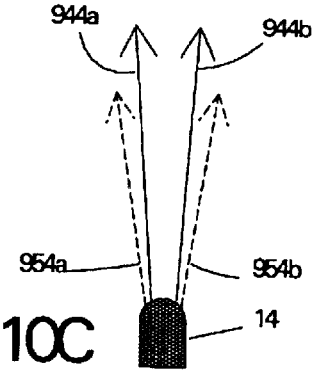
FIG 10C
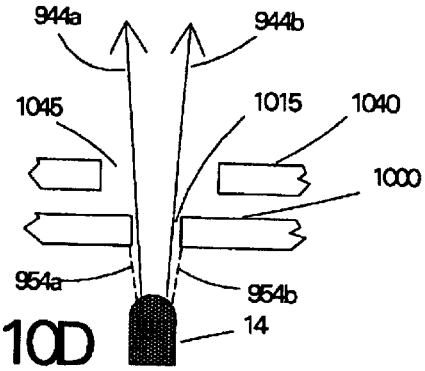
FIG 10D

LIGHTING DEVICE WITH BEAM ALTERING MECHANISM INCORPORATING A PLURALITY OF LIGHT SOURCES

Matter enclosed in heavy brackets [ ] appears in the original patent but forms no part of this reissue specification; matter printed in italics indicates the additions made by reissue.

FIELD OF THE INVENTION

The present invention relates to the field of lighting devices and more particularly to methods of controlling a lighting device including a plurality of light sources.

INCORPORATION BY REFERENCE

The present application incorporates by reference the application titled "Improvements to Lighting Devices Using a Plurality of Light Sources" filed on Mar. 15, 2000, Ser. No. 09/526,599.

BACKGROUND OF THE INVENTION

When using a lighting device to illuminate an area it is often found necessary to alter the beam of the projected light to provide control over the color or focus. For example often a flashlight might be equipped with a means for changing the profile of the emitted light beam from a spot to a wash.

U.S. Pat. No. 4,855,884 to Richardson discloses a variable beam width stage light with a single light source, relying on an axially movable reflector for changes in beam width. The reflector is constructed of a plurality of reflective leaves that are moved by a motor to change the focal length of the reflector. U.S. Pat. No. 4,729,070 to Chiu discloses an adjustable ring for concentrating multiple beams of light. Chiu discloses an apparatus for changing the angle of incidence of a plurality of light sources arranged in a ring. A threaded holder surrounds the ring of light sources while a cam mechanism adjusts the angle of the light sources that is operated by turning the threaded holder. U.S. Pat. No. 5,752,766 to Bailey et al. discloses a multi-color focusable LED stage light. A linear actuator is operable to move a base member containing an array of LEDs which in turn cause the LED array to change the direction of the optical axes of a substantial number of LEDs. By deforming the base member 20 in Bailey, the LEDs can be converged or diverged on an area to be illuminated.

Multi-parameter lights of the prior art utilize a single light source with mechanisms driven by motors to vary the focus, color, position and intensity. U.S. Pat. No. 3,845,351 to Ballmoos et al. titled: "METHOD AND APPARATUS FOR THE ADJUSTMENT OF A PLURALITY OF FLOODLIGHTS" discloses a number of floodlights especially for the illumination of a stage or studio, in which the parameters azimuth, elevation, brightness, focus and color of a bundle of light rays of each floodlight are adjusted to an optimum value for any one of a plurality of lighting effects.

U.S. Pat. No. 4,392,187 to Bornhorst titled: "Computer controlled lighting system having automatically variable position, color, intensity and beam divergence" illustrates another example of the prior art. Each of the instruments houses a central lamp and an optical system designed to collimate the light from the lamp and vary the parameters of the light by inserting motor driven optical components into the light by remote control.

Multi-parameter lights are generally controlled by a central control system via a serial data communications system.

An operator operating the central control system may control each multi-parameter light separately to adjust the parameters. Each multi-parameter light may be provided with a communications address so that each multi-parameter light may be addressed separately by an operator operating the control system.

Multi-parameter lights of the prior art are depicted in a HIGH END SYSTEMS (trademarked) Product Line 1997 brochure. It is known in the art to construct a lighting device using a plurality of light emitting diodes (LEDs) such as disclosed in U.S. Pat. No. 5,752,766 to Bailey et al.

U.S. Pat. No. 5,652,766 to Bailey et al. titled "Multi-color focusable stage light" and is incorporated by reference herein describes an LED stage lighting instrument constructed of arrays of red, blue, and green LEDs.

The red, blue and green LEDs are operated in an additive color system to produce various colors of light by mixing the primary colors of red, blue and green together in various combinations. In my pending application entitled "IMPROVEMENTS TO LIGHTING DEVICES USING A PLURALITY OF LIGHT SOURCES", filed on Mar. 15, 2000, Ser. No. 09/526,599 describe some of the disadvantages of constructing a lighting device using discrete spectral LEDs of Red, Blue and Green. When creating white light through the use of an additive color system using red, green and blue wavelengths (RGB), the spectral energy adjacent to the red, green and blue wavelengths is usually omitted. An RBG system used to create white light can sometimes be problematic when illuminating objects that absorb or reflect very specific wavelengths of light. Illuminating these types of objects with RGB derived white light often may result in an erroneous perception of color by the viewer as compared to viewing the object under continuous spectrum white light.

Broad-spectrum visible white light emitting diodes such as those manufactured by Nichia Chemical Corporation of Japan can be used to produce a lighting device that produces white light without using the discrete spectral LED's used in a color additive system. The term "white light LED" refers to a light emitting diode that provides a spectrum that is seen by the human eye for all purposes as white. One disadvantage is that the device constructed of exclusively white light LED's cannot produce colors without placing a color filter in the path of the projected light. Placing a single filter over a plurality of white light LED's can be accomplished but as the array of white light LEDs increases in numbers the filters become quite large.

U.S. Pat. No. 5,652,766 to Bailey discusses the use of a flexible base member to change the focus of a plurality of red, blue and green LEDs with an LED stage light. My co pending application, Ser. No. 09/526,599 discussed the use of a variable filter that may be a liquid crystal emulsion filter mounted after the light sources. Changing the voltage to the filter causes the light from the light sources to pass through the filter deflected or undeflected depending on the voltage state. The above methods alter the projected light from a narrowed angle to a wider angle by varying the diffusion of the light or by redirecting the individual light sources to a different emitting angle.

SUMMARY OF THE INVENTION

In one embodiment of the present invention, an apparatus is provided comprising a substrate having a first light source and a second light source mounted thereon and an aperture device having a first aperture and a second aperture. The aperture device can be aligned over the substrate so that light from the first light source is emitted through the first aperture and light from the second light source is emitted through the second aperture. The first and second light sources may be light emitting diodes.

The aperture device may be comprised of third and fourth apertures. In one embodiment the aperture device can be aligned over the substrate so that light from the first light source is emitted through the third aperture and light from the second light source is emitted through the fourth aperture. The aperture device may be comprised of an aperture plate which includes the first and second apertures. The aperture plate may be round. The aperture device may be rotationally mounted centrally over the substrate.

Each of the light sources may emit a broad-spectrum visible white light. The aperture device such as an aperture plate may be comprised of a transparent material. The substrate with the light sources mounted thereon and the aperture device may be built into a multi-parameter lighting device or into a flashlight.

Generally a plurality of light sources may be mounted to the substrate. Generally, an aperture plate may be provided with a plurality of apertures that are strategically aligned with the individual light beams emitted from each of the plurality of light sources. There may be a set of apertures for each individual light beam. The aperture device may be referred to as a beam altering mechanism for altering the light projected by the plurality of light sources. The present invention, in various embodiments, may be included in hand held flashlights, theatrical lighting, and may have other applications. Theatrical lighting is used in concerts, special events, nightclubs, television studios, restaurants and theme parks.

The beam altering mechanism (which in one form includes an aperture device) can be capable of changing the color of the emitted light beam produced by for example, a flashlight. In one embodiment additional apertures containing color modifying filters are also strategically placed in the aperture device (or aperture plate) and these modifying filters can be aligned over each of the light sources by rotation of the aperture device, such as an aperture plate.

Access for rotating the aperture plate by the user, in a flashlight embodiment for example, is accomplished by allowing at least part of the aperture plate to protrude from a housing of the flashlight. It is preferred that the plurality of light sources are arranged symmetrically to provide uniform illumination.

In another embodiment of the present invention the aperture device, which may be an aperture plate, is arranged with a plurality of apertures that contain light refractive optics that are strategically placed in the aperture device and provide a means for changing the focus of the overall beam (sum of the light beams from the individual light sources) produced by the flashlight. It is possible that the invention in one or more embodiments could be used to change most of the light beam emitted by the lighting device but the light from one or more LED's may not be changed. Allowing some LEDs to remain unchanged can provide a mixture of white and colored light producing more pastel colors. For an aperture plate with light refractive optics allowing some LEDs to remain unchanged may provide desired differences in the overall profile of the light beam emitted by the plurality of light sources.

A further embodiment of the present invention discloses a remote controlled lighting device incorporating a plurality of light sources and a beam altering mechanism capable of altering the beam of the projected light from each of the light sources. The beam altering mechanism can be comprised of an aperture device, such as an aperture plate, provided with a plurality of apertures that are strategically aligned with the individual light beams emitted from each of the plurality of light sources.

In one embodiment of the present invention, the aperture plate is round and is centrally and rotationally mounted to a shaft connected to a stepping motor. In this embodiment the stepping motor can be capable of remotely rotating the aperture plate into a position. The light sources can be arranged symmetrically to provide uniform illumination.

In another embodiment of the present invention the aperture device is arranged with a plurality of apertures that contain light refractive optics that are strategically placed in the aperture plate and provide a means for changing the focus of the beam produced by the lighting device. A masking device, which may be a masking plate, may also be provided in one embodiment.

BRIEF DESCRIPTION OF THE DRAWINGS

FIG. 1A illustrates a top planar view of a light emitting diode (hereinafter "LED") mounting substrate with four LEDs mounted in a symmetrical fashion;

FIG. 1B illustrates a side view of the substrate of FIG. 1A with arrows indicating the direction of the light emitted by each of the light emitting diodes;

FIG. 1C illustrates an aperture plate with strategically placed apertures that align during rotation with the LED's mounted in the LED mounting substrate of FIG. 1A.

FIG. 10A illustrates a masking plate;

FIG. 10B illustrates the masking plate of FIG. 10A incorporated into the device shown in FIG. 2B;

FIG. 10C shows an LED emitting projected light;

FIG. 10D shows a section of a masking plate used in conjunction with the LED of FIG. 10C and an aperture plate;

DETAILED DESCRIPTION OF THE DRAWINGS

Figure 2A:
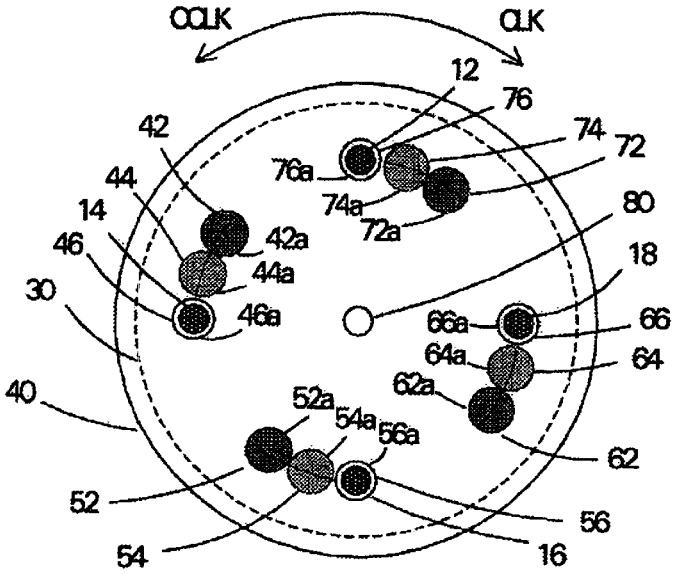
FIG. 2A Illustrates the aperture plate of FIG. 1C centrally fixed over the LED mounting substrate of FIG. 1A and employing several color filters mounted over the strategically placed apertures, with arrows indicating the direction of movement.

FIG. 1A illustrates a top planar view of an apparatus 10 including a light emitting diode (hereinafter "LED") mounting substrate 30 with LEDs 12, 14, 16, and 18 mounted on the substrate 30 in a symmetrical fashion. The substrate 30 includes a central mounting hole 20 at the center of the substrate. The substrate 30 can be circular in shape as shown.

It is preferred that the LEDs 12, 14, 16, and 18 be basically symmetrically mounted as to provide ease of construction and even illumination of the projected light, such as the light, whose direction is shown by arrows 15a, 15b, 17a, 17b, 19a and 19b. The mounting substrate 30 may be made of circuit board material. The mounting substrate 30 acts as a base for the LEDs 12, 14, 16, and 18. There would be electrical contacts to the LEDs 12, 14, 16, and 18 and driving circuit to the LED's 12, 14, 16, and 18, not shown to light the LEDs, however these are well known in the art. The LED mounting substrate 30 could be made of a plastic, elastomer, metal, glass or other suitable material. The LEDs 12, 14, 16, and 18 may each be manufactured in a plastic or glass casing as known in the art. The casing of each LED may contain a lens to direct the direction of the projected light beam created by each LED of LEDs 12,14, 16, and 18. The LEDs 12,14,16, and 18 may also be constructed of a reflector LED combination where the reflector directs the direction of the projected light as known in the art.

FIG. 1B illustrates a side view of the apparatus 10 of FIG. 1A. FIG. 1B additionally shows arrows for the direction of light from each of the light emitting diodes 14,16, and 18. LED 14 emits light in the direction shown by arrows 15a and 15b, LED 16 emits light in the direction shown by arrows 17a and 17b, and LED18 emits light in the direction shown by arrows 19a and 19b.

FIG. 1C illustrates an aperture plate 40 with strategically placed apertures that align during rotation with the LED's mounted to the LED mounting substrate 30 of FIG. 1A. Aperture plate 40 includes apertures 42, 44, 46, 52, 54, 56, 62, 64, 66, 72, 74, and 76. Aperture plate 40 also includes a hole 80 for aligning with the hole 20 of the substrate 30. The twelve apertures (42, 44, 46, 52, 54, 56, 64, 66, 72, 74, and 76 are arranged into four groups of three apertures and each group of three apertures is strategically placed as to align coaxially with the LED's 12,14,16, and 18 shown in FIG. 1A when the aperture plate 40 is centrally mounted to the LED mounting substrate 30 of FIG. 1A. The aperture plate 40 is then rotated to select one of the three apertures to align coaxially over the corresponding LED (of 12,14,16, and 18) on the LED mounting substrate 30. The aperture plate 40 may be able to rotate three hundred sixty degrees or may be restricted in motion, for example by a stop, so that only one of a set of three apertures can lie over each of LED's 12,14,16, and 18, with each LED having its own set of three possible apertures.

Various methods or apparatus such as a limiting switch or an encoder could be used to keep track of the location of the rotational position of the aperture plate 40 in relation to the LED mounting substrate 30.

Figure 2B:
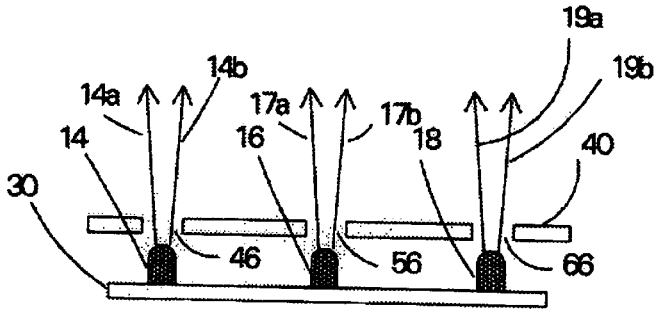
FIG. 2B illustrates a side view of FIG. 2A.

FIGS. 2A and 2B Illustrate top and side views of the aperture plate 40 of FIG. 1C centrally fixed over the LED mounting substrate 30 of FIG. 1A. FIG. 2A also shows color filters 42, 44, 52, 54, 62, 64, 72, and 74 which may be attached to the aperture plate 40 and mounted over strategically placed apertures. The color filters are not shown in the FIG. 2B view to simplify description.

FIGS. 2A and 2B show apertures 46, 56, and 66, directly over LEDs 14, 16, and 18, respectively. FIG. 2A shows color filters 42a, 44a, 52a, 54a, 62a, 64a, 72a, and 74a at the location of apertures 42, 44, 52, 54, 62, 64, 72, and 74, respectively.

In FIG. 2A a top view of the aperture plate 40 is shown mounted over the LED mounting substrate 30. Two different frequencies of color filters are shown mounted over two of the apertures of each of the four sets of three apertures. For example color filters 42a and 44a which are of different frequencies are shown mounted over aperture 42 and 44. Filter 42a is shown with dark shading and filter 44a is shown with light shading. Filters 52a, 62a, and 72a have the same color and the same frequency as filter 42a. Filters 54a, 64a, and 74a have the same color and the same frequency as filter 52a. Each of the color filters may be plastic, or glass and be absorbing or reflective as known in the art. Each of the color filters may be fixed to the aperture plate 40 by gluing or by pressure clip or other suitable means known in the art. Two arrows that indicate "CCLK" for counter clockwise and "CCK" for clockwise are depicted in FIG. 2A. Also shown are the LED's 12, 14, 16, and 18 of the LED mounting substrate 30 shown coaxial with four of the apertures 76, 46, 56, and 66, respectively to allow light to pass unfiltered. The center hole 80 shown in FIG. 2A may represent an axle pin 90 of FIG. 7A or a hub 622 of FIG. 7B. The dotted circular line represents the outside diameter of the LED mounting substrate 30 of FIG. 1A.

Figure 2C:
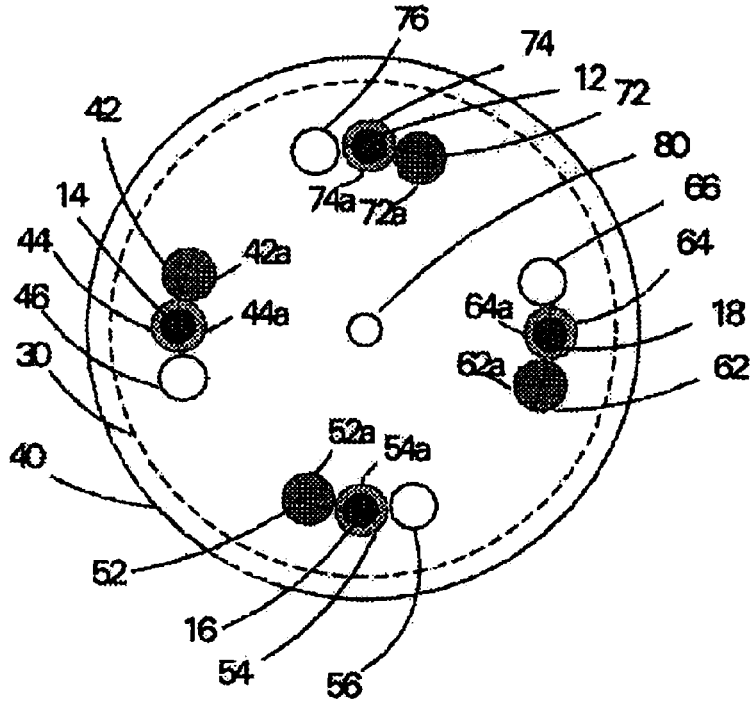
FIG. 2C illustrates the device of FIG. 2A but with the aperture plate rotated one aperture counter clockwise to place the LEDs coaxial with the one frequency of color filters.

FIG. 2C illustrates a device of FIG. 2A but with the aperture plate 40 rotated one aperture counter clockwise with respect to the substrate 30, to place the LEDs, 12, 14, 16, and 18 coaxial with the one frequency of color filters. FIG. 2C shows the LED 14 coaxial with the aperture 44 and filter 44a, so that light from the LED 14 passes through the aperture 44 and then through the filter 44a, and is filtered by filter 44a. Similarly FIG. 2C shows LEDs 16, 18, and 12 coaxial with apertures 54, 64, and 74 having filters 54a, 64a, and 74a. The filters 44a, 54a, 64a, and 74a are of the same frequency, such as for example 520 to 540 nanometers to pass green light, and filter the light from LEDs 14, 16, 18, and 12 respectively in the same or in a similar manner.

Figure 2D:
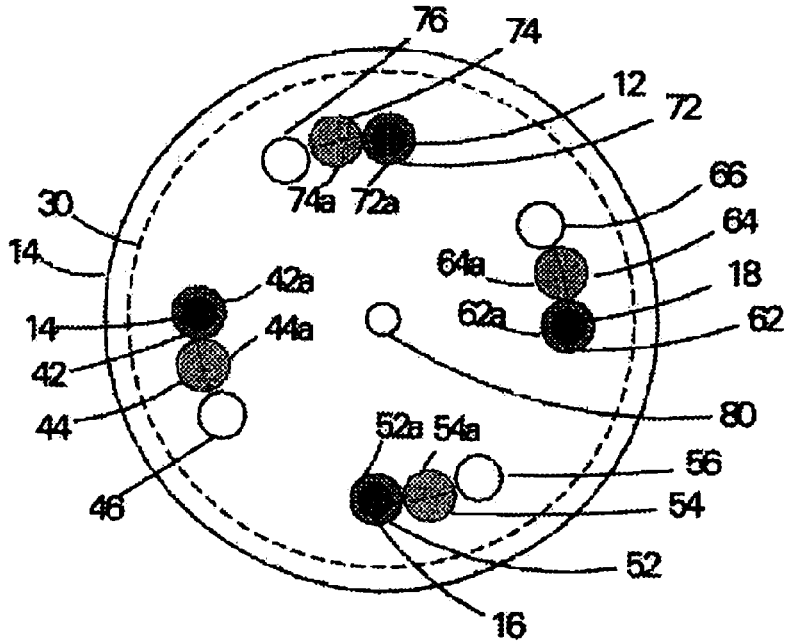
FIG. 2D illustrates the device of FIG. 2A but with the aperture plate rotated two apertures counter clockwise to place the LEDs coaxial with yet another frequency of the two frequencies of color filters shown.

FIG. 2D illustrates the device of FIG. 2A but with the aperture plate 40 rotated two apertures counter clockwise with respect to the substrate 30 to place the LEDs 12, 14, 16, and 18 coaxial with yet another frequency of the two frequencies of color filters shown. FIG. 2D shows the LED 14 coaxial with the aperture 42 and filter 42a, so that light from the LED 14 passes through the aperture 42 and then through the filter 42a, and is filtered by filter 42a. Similarly FIG. 2D shows LEDs 16, 18, and 12 coaxial with apertures 52, 62, and 72 having filters 52a, 62a, and 72a. The filters 42a, 52a, 62a, and 72a are of the same frequency, such as for example 650 to 670 nanometers to pass red light, and filter the light from LEDs 14, 16, 18, and 12 respectively in the same or in a similar manner.

Figure 3A:
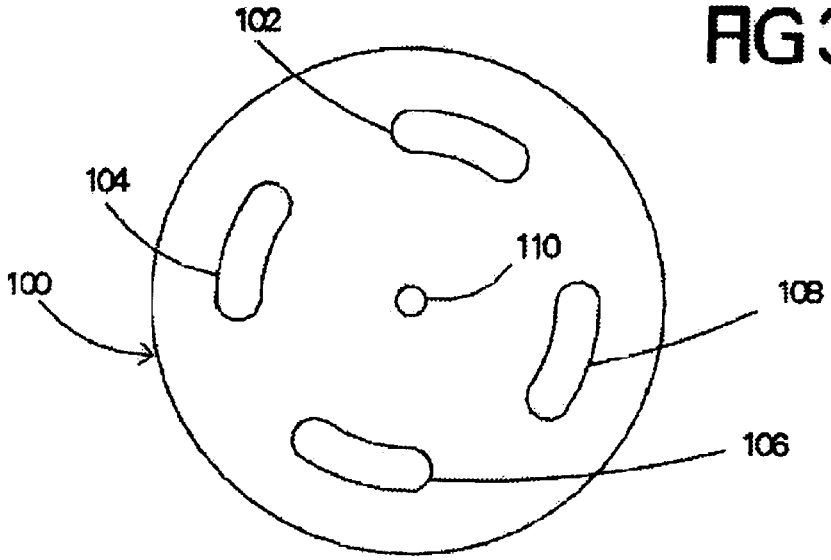
FIG. 3A illustrates another type of aperture plate of the invention with slotted apertures.
Figure 3B:
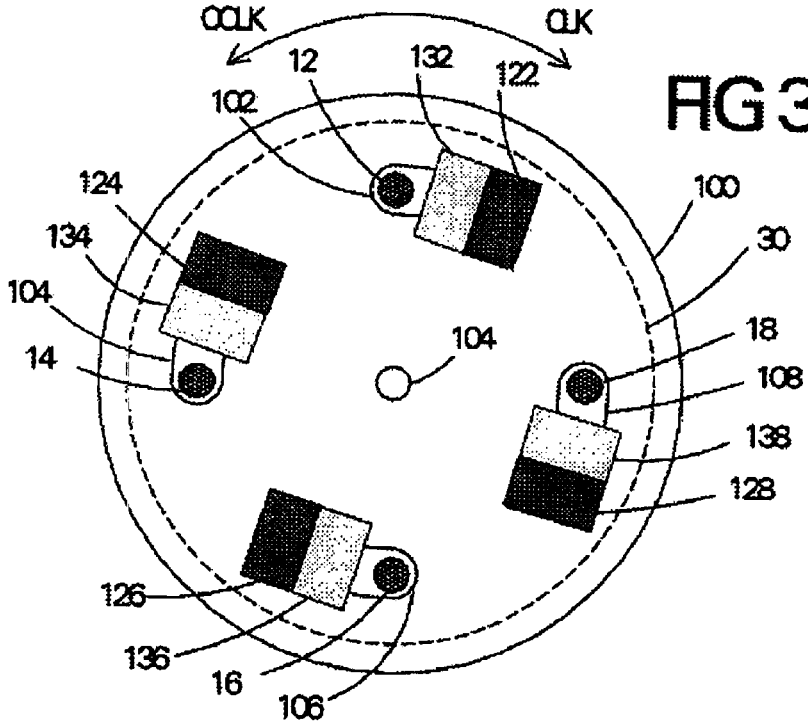
FIG. 3B Illustrates an aperture plate centrally mounted over the LED mounting substrate of FIG. 1A and employing several color filters mounted over the slotted apertures with arrows indicating the direction of movement.

FIG. 3A illustrates an aperture plate 100 of another embodiment of the present invention having slotted apertures 102, 104, 106, and 108. The aperture plate 100 includes a hole 110. FIG. 3B Illustrates the aperture plate 100 centrally mounted over the LED mounting substrate 30 of FIG. 1A and employing color filters 122, 124, 126, 128, and 132, 134, 136, and 138. The color filters 122 and 132 are mounted over the slotted aperture 102. Color filters 124 and 134 are mounted over the slotted aperture 104. Color filters 126 and 136 are mounted over the slotted aperture 106. Color filters 128 and 138 are mounted over the slotted aperture 108.

Two different frequencies of color filters are shown mounted over sections of a slotted aperture. Four slotted apertures are shown with each aperture allowing for the light projected from the corresponding LED on the LED mounting substrate 30 to pass its projected light unobstructed. For example LED 12 can pass through slotted aperture 102 unobstructed as shown in FIG. 3B or either filter 122 or filter 132 may be placed over the LED 12. Filters 122, 124, 126, and 128 may be all have the same color and the same frequency. Filters 132, 134, 136, and 138 may all have the same color and the same frequency.

The color filters 122,124, 126,128,132,134,136, and 138 may be plastic, or glass and may be absorbing or reflective as known in the art. The color filters 122,124, 126, 128, 132, 134, 136, and 138 may be fixed to the aperture plate 100 by gluing or by pressure clip or other suitable means known in the art. Two arrows that indicate "CCLK" for counter clockwise and "CCK" for clockwise are depicted. The center hole 110 shown in FIG. 3B may represent the axle pin 90 of FIG. 7A or the hub 622 of FIG. 7B. The dotted circular line represents the outside diameter of the LED mounting substrate 30 of FIG. 1A.

Slotted apertures 102, 104,106, and 108 of the aperture plate 100 allow modification of the light from the LEDs 12,14, 16, and 18 in a somewhat more continuous manner as opposed to the aperture plate 40 of FIG. 1C, where there are sections between apertures. I.e. In FIG. 1C there is a solid section between aperture 42 and 44 for example, which can obstruct the projected light when selecting apertures. A slotted aperture may be designed of a different geometrical shape than the ones shown as 102,104,106, and 108 of FIG. 3A. For example the aperture 102 of FIG. 3A is shown for the most part oval. A rectangular shaped aperture could be substituted for the aperture 102 of FIG. 3A and still achieve similar results.

Figure 4A:
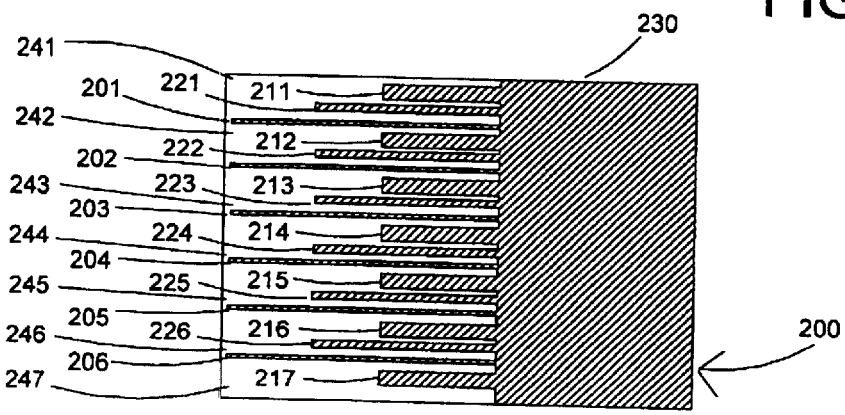
FIG. 4A illustrates another type of color filter used with an embodiment of the invention and has sections of the filtered area on the filter removed as to provide variable density of the color across it's surface.

FIG. 4A illustrates a color filter 200 which can be used with an embodiment of the present invention. The color filter 200 has sections dark sections 201–206, 211–217, and 221–226, and 230, all of which have filtering material. The color filter also has clear sections 241–247 which do not have filtering material.

Figure 4B:
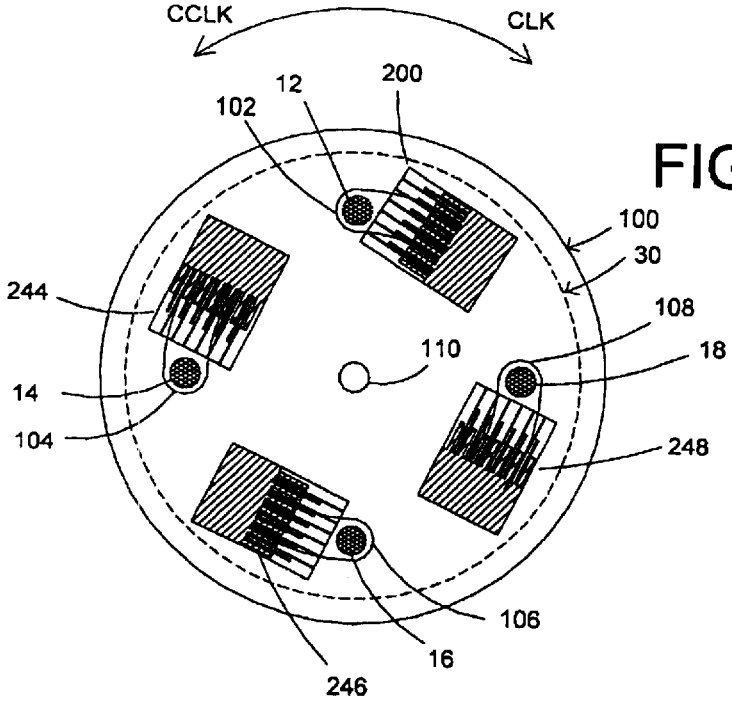
FIG. 4B illustrates the color filter type in FIG. 4A applied to the aperture plate of FIG. 3A and mounted over the LED mounting substrate of FIG. 1A in accordance with an embodiment of the present invention.

Sections 241–247 or the clear sections are sections where the filter material has been removed or not applied to let light pass through unfiltered. As aperture plate 100 of FIG. 4B is turned Counter Clockwise some of the filter material passes over an LED, such as LED 12. The further Counter Clockwise aperture plate 100 is turned the higher the density of the filter material is placed over the LED 12. Various types of known variable density filters could be used. For example, a known silk screen filter material on a clear plastic in a dot pattern can be used instead of filter 200. The silk screen filter is screened with dots that have less space between the dots in one direction.

Various sections of the filtered material area (such as sections 201–206, 211–217, and 221–226, and 230) can be removed as to provide variable density of color across the surface of the color filter 200. In FIG. 4A the substrate of the filter 200 itself may be made of clear plastic or glass. The dark lines (such as for sections 201–206, 211–217, 221–226) represent where the color filter dye or coatings are applied to the substrate of the filter 200. For example dark lines 201 through 206 represent the minimum amount of color density to the left hand side of FIG. 4A. As you move across the filter 200, lines 221 through 226 become apparent and thus there is a higher density of color filtering material.

The methods of creating variable density filters are known in the art. Variable filters, such as filter 200, may be constructed of plastic or glass and the manufacture and production are known in the art.

FIG. 4B illustrates a plurality of color filters of the same type as color filter 200 in FIG. 4A applied to the aperture plate 100 of FIG. 3A and mounted over the LED mounting substrate 30 of FIG. 1A in accordance with an embodiment of the present invention. FIG. 4B shows color filters 200, 244, 246, and 248. The color filters 200, 244, 246, and 248 may be of the same type. Color filters 200, 244, 246, and 248 are mounted to the aperture plate 100. The aperture plate 100 can rotate in a clockwise direction ("CLK") or in a counterclockwise direction ("CCLK") as shown in FIG. 4B. Rotation of the aperture plate 100 causes the filters 200, 244, 246, and 248 to move with respect the LEDs 12, 14, 16, and 18. For example filter 200 can be moved over LED 12 in a graduated movement to add more saturation of color to the LED 12. Typically, one filter corresponds to one LED, and each filter, such as filter 200, can be positioned relative to the each LED, such as LED 12. Filter 200 may cover LED 12 with different sections of the filter 200 covering LED 12. I.e. in one position, light from LED 12 may only pass through one or more of clear sections 241–247 and one or more of thin filter sections 201–206 (but not through sections 211–217 or 230). In a second position of the aperture plate 100, light from LED 12 may pass through one or more of filter sections 211–217 (but not through section 230). In a third position, light from LED 12 may pass only through section 230.

Four slotted apertures 102, 104, 106, and 108 are shown with each aperture allowing for the light projected from the corresponding LED on the LED mounting substrate 30 to pass its projected light unobstructed. The variable density color filters 200, 244, 246, and 248 may be fixed by gluing or by pressure clip or other suitable means known in the art. Two arrows that indicate "CCLK" for counter clockwise and "CCK" for clockwise are depicted. The center hole 110 shown in the drawing may represent the axle pin 90 of FIG. 7A or the hub 622 of FIG. 7B. The dotted circular line represents the outside diameter of the LED mounting substrate 30. An aperture plate, similar to aperture plate 100, may be constructed of the filter material substrate, which is used for a filter, such as filter 200. This filter material could be glass or plastic. Areas of the filter material substrate could be removed by striping or cutting to function as the variable density filter 200. Strategically placed stripped or cutaway apertures on the aperture plate made of the filter material substrate can be designed to align with one or more of the LEDs 12, 14, 16, and 18 of LED mounting substrate 30 FIG. 1A.

Figure 5A:
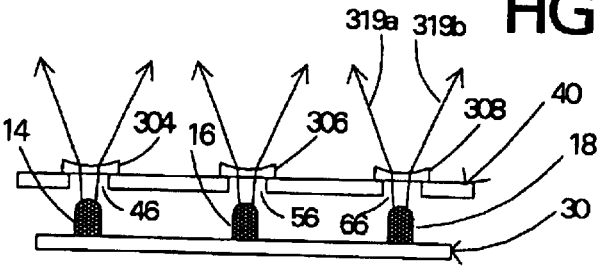
FIG. 5A shows the side view of another embodiment of the invention wherein an aperture plate which is shown as the aperture plate of FIG. 2A (but may alternatively be the aperture plate of FIG. 3B) is supplied with beam altering lenses and is fixed to operate over the LED mounting plate of FIG. 1A.

FIG. 5A shows the side view of another embodiment of the invention the aperture plate 40 of FIG. 2A is shown (but may alternatively be the aperture plate 100 of FIG. 3B) and is supplied with beam altering lenses 304, 306, and 308 which are fixed to the aperture plate 40 and which can rotate over the LED mounting substrate 30 of FIG. 1A. The aperture plate 40 in FIG. 5A is shown centrally rotatably mounted to the substrate 30.

The altering lenses 304, 306, and 308 may be light refractive optics that are fixed to the aperture plate 40 over apertures 46, 56, and 66. The apertures 46, 56, and 66 can be aligned simultaneously with a corresponding LED 14, 16, and 18 on the LED mounting substrate 30 as shown in FIG. 5A. In the preferred version at least one position of the aperture plate 40 allows at least two of the LED's (of LEDs 12, 14, 16, and 18) to pass their projected light essentially unobstructed. The aperture plate 40 with the additional of lenses 304, 306, and 308, can be made of any suitable material including glass, metal or plastic. The light refractive optics 302, 304, and 306 can be fixed to the aperture plate 40 by gluing or by pressure clip or other suitable means known in the art. The light refractive optics may have positive of negative optical power. It is preferred that the light refractive optics 302, 304, and 306 have substantially the same optical power. They may be positive lenses, negative lenses, fresnel lenses or lenticular lenses as known in the art. The light refractive optics may also be formed of a diffusion material as well known in the art.

Figure 5B:
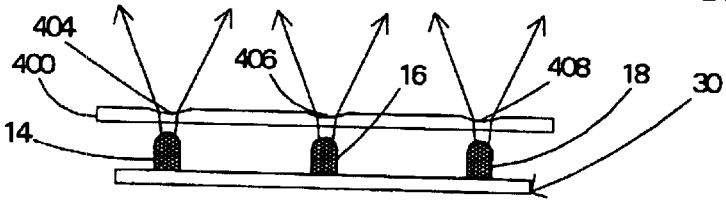
FIG. 5B illustrates an aperture plate molded or fabricated of an optical substrate where the lenses or optical beam altering components are an integral component of the aperture plate and wherein the aperture plate is fixed to operate over the LED mounting plate of FIG. 1A.

FIG. 5B illustrates an aperture plate 400 molded or fabricated of an optical substrate where the lenses or optical beam altering components are an integral component of the aperture plate 400 and wherein the aperture plate 400 is fixed to operate over the LED mounting substrate 30 of FIG. 1A. The aperture plate 400 includes lenses 404, 406, and 408 which are an integral part of the aperture plate 400. FIG. 5B illustrates a device essentially the same as FIG. 5A except the aperture plate 400 (still incorporating strategically placed apertures) is constructed of an optical material that may have the light refractive optics or lenses 404, 406, and 408 molded or fabricated into the material. The manufacture of light refractive optics in optical materials is well known in the art.

Figure 5C:
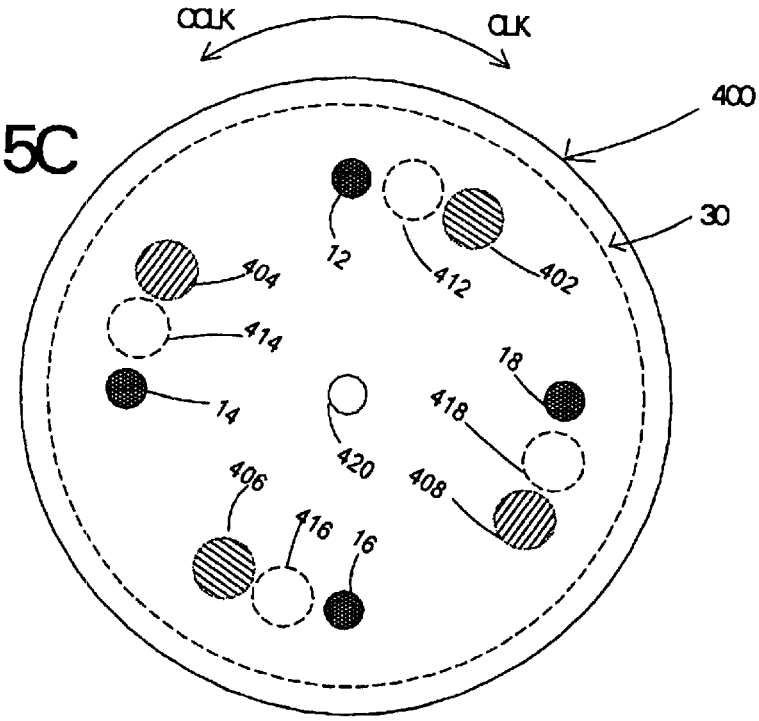
FIG. 5C illustrates a top planar view of the molded or fabricated optical substrate aperture plate shown in FIG. 5B but rotated.

FIG. 5C illustrates a top planar view of the molded or fabricated optical substrate aperture plate 400 shown in FIG. 5B. Portions 402, 412, 404, 414, 406, 416, 408 and 418 are shown. The LEDs 12, 14,16, and 18 of the LED mounting plate 30 are shown transparently through the molded or fabricated optical aperture plate 400. Since the aperture plate 400 is transparent it does not require through hole apertures. If one wished, through hole apertures could be strategically placed in the aperture plate to reduce light loss when light projected by the LEDs 12,14,16, and 18 is required without light refractive optics. Plates fabricated of transparent glass or plastics can have the through holes drilled, cut or molded as known in the art. Shown in FIG. 5C are eight strategically placed beam-modifying optics 402, 412, 404, 414, 406, 416, 408, and 418 fabricated into the optical aperture plate 400. Shown are four beam modifying optics 412, 414, 416, and 418 of a radial type such as a positive or negative lens. It is preferred that the lens type selected have substantially the same optical power. These are depicted by the four small dotted circles. Shown are four lenticular type lenses 402, 404, 406, and 408 shown by the lenticular lines. It is preferred that the lens type selected have substantially the same optical power. Two arrows that indicate "CCLK" for counter clockwise and "CCK" for clockwise are depicted. The center hole 420 shown in the drawing may represent the axle pin 90 of FIG. 7A or the hub 622 of FIG. 7B. The large dotted circular line represents the outside diameter of the LED mounting substrate 30 of FIG. 1A.

As the aperture plate 400 is rotated over the LED mounting substrate 30 in a counterclockwise direction, the light refractive optics 412 through 418, are positioned strategically over the LEDs mounted to the LED substrate. The light refractive optics 412 through 418 shown as lenses such as 304 through 308 of FIG. 5A. The lenses shown in FIG. 5A are known in the art as negative lenses. Next with further counterclockwise rotation of 400 of FIG. 5C "lenticular lenses" 402 through 408 are strategically positioned over the LEDs. The lenticular lenses are shown on the aperture plate of FIG. 5C along with the negative lenses as an example of a combination wheel with different light refractive optic types. Lenticular lenses are known in the art.

Figure 6:
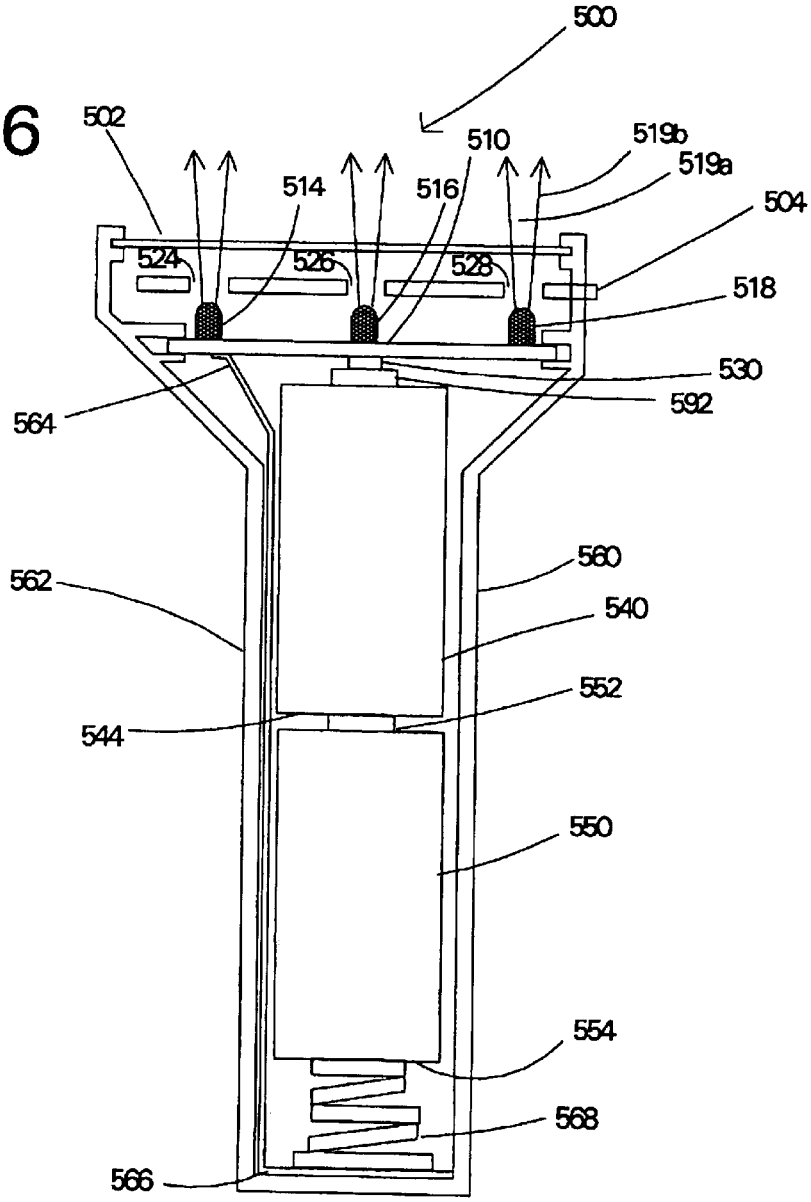
FIG. 6 illustrates a flashlight incorporating the beam altering feature of the present invention for a plurality of LED's.

FIG. 6 illustrates a flashlight 500 incorporating the beam altering feature of the present invention for a plurality of LED's. The flashlight 500 includes a transparent cover 502, an aperture plate 504 having openings 524, 526, and 528, substrate 510, LEDs 514, 516, and 518, a terminal 530 which is connected to the substrate 510, a battery 540 and a battery 550, outer housing 562, outer housing 560, spring conductors 564, 566, and spring 568. Battery 540 has terminals 542 and 544. Battery 550 has terminals 552 and 554. FIG. 6 shows arrows 519a and 519b to show the direction of light emitted by LED 528.

Figure 7A:
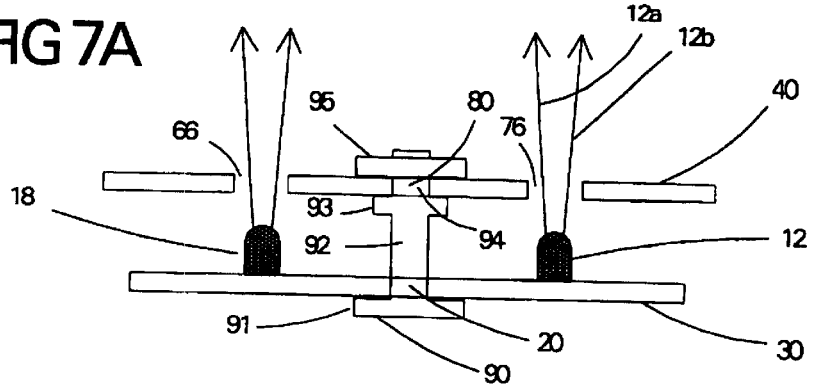
FIG. 7A illustrates another side view of FIG. 2A showing a centrally mounted pin that interconnects the LED mounting substrate and the aperture plate.

The LED mounting substrate 510 is centrally mounted under the aperture plate 504. The aperture plate 504 may have color filters or beam modifying optics or a combination of both as described earlier in the present application. The aperture plate 504 and the LED mounting substrate 510 are centrally mounted as shown in FIG. 7A. Part of the aperture plate 504 is allowed to protrude through the housing 560 of the flashlight 500 to permit rotation of the aperture plate 504 and bring the strategically aligned filters into or out of position over the LEDs 514, 516, and 518 on the LED mounting substrate 510. The electrical connection to the batteries 540 and 550 located beneath the LED substrate 510 may be incorporated into the axle pin 90 like the pin shown in FIG. 7A. However any type of electrical connection to the LED mounting substrate 510 might be used. A power switch is not shown for simplification.

The LED substrate, such as substrate 30 may of course not be round but round or circular is preferred. The aperture plate, such as plate 40 may not be round but round or circular is preferred. The mounting of the aperture plate, such as 40 to the LED mounting substrate, such as 30, may be a pin 90 like that shown in FIG. 7A or it could be a fastener or bushing sleeve or any other method. The aperture plate 40 or the LED mounting substrate 30 do not have to be mounted centrally but it is preferred. The mounting could take place around the circumference with bearings that still allow the positioning of the aperture plate, such as 40, to be variably aligned with the LED mounting substrate, such as 30. It may be possible to "slide" the aperture plate 40 across an LED mounting substrate 30 to strategically align the apertures with the LEDs (such as 12, 14, 16, and 18) on the LED mounting substrate 30.

FIG. 7A illustrates another side view of FIG. 2A showing a centrally mounted pin 90 that interconnects the LED mounting substrate 30 and the aperture plate 40. The center mounting pin 90 includes outer portion 91, and portions 92, 93, and 94. A retaining clip 95 is shown clipped onto the axle pin 90 to secure the aperture plate 40 to the pin 90. A portion 92 of the pin may fit through a hole 20 in the substrate 30 and a portion 94 may fit through the hold 80 in the aperture plate 40. The portion 93 keeps the aperture plate 40 a certain distance above the substrate 30 so that the LEDs 18 and 12, and other LEDs are not crushed by the plate 40. The direction of light emitted, for example by LED 12,is shown by arrows 12a and 12b coming through opening 76 in plate 40.

In FIG. 7A the axle mounting pin 90 is shown mounted from the bottom of the LED mounting substrate 30. The perspective of the LED mounting substrate 30 shown in FIG. 1B has been changed to the FIG. 7A perspective to facilitate the illustration of the axle mounting pin 90. The axle pin 90 is pressure fitted to the substrate center hole 20 in a manner known in the art. The aperture plate 40 is shown with the pin 90 passing through the center point 80 of the aperture plate 40. The aperture plate 40 can be rotated in relation to the LED mounting substrate 30.

Figure 7B:
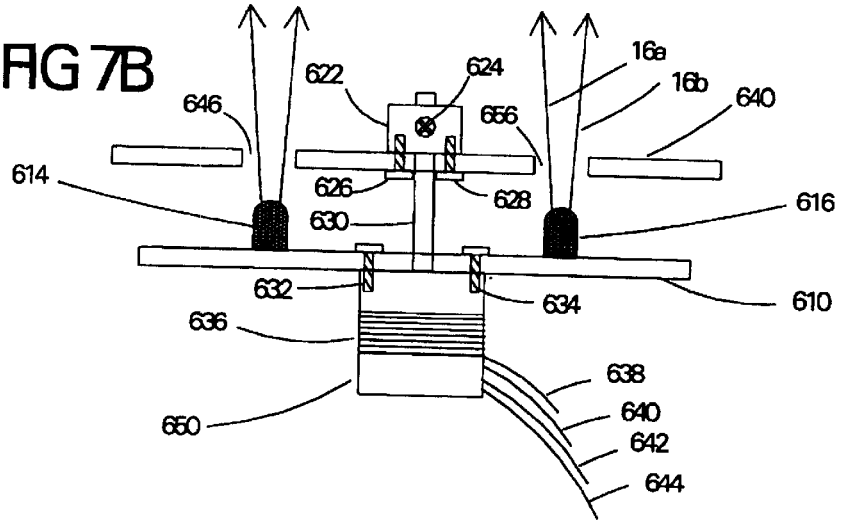
FIG. 7B illustrates another side view of FIG. 2A showing a stepping motor mounted to the LED mounting plate of FIG. 2A and a motor shaft extending through the LED mounting plate and up through the aperture plate and also wherein a hub with a setscrew is shown set to the motor shaft and fixed by fasteners to the aperture plate.

FIG. 7B illustrates a side view of another embodiment of the present invention showing a stepper motor 650 mounted to an LED mounting substrate 610 (may be similar to substrate 30 of FIG. 2A) and a motor shaft 630 extending through the LED mounting substrate 610 and up through an aperture plate 640 (which may be similar to mounting plate 40 of FIG. 1C). FIG. 7B also shows LEDs 614 and 616 which may be similar to LEDs 14 and 16 of FIG. 1A. The stepper motor 650 is mounted to the LED mounting substrate 610 by screws 632 and 634. The set of conductors 638, 640, 642, and 644 apply electrical power to the stepper motor 650. A stack of magnetic plates 636 is also shown that is typically part of a stepper motor. The shaft 630 is rotatably mounted to the stepper motor 650 so that the motor 650 can cause the shaft 630 to turn and thereby cause the aperture plate 640 to turn. The shaft 630 is mounted to the aperture plate 640 by screws 626 and 628 and hub 622. The set screw 624 fixes the shaft 630 to the hub 622 and thus to the aperture plate 640. The aperture plate 640 has openings 646 and 656 through which light from LED 614 and 616 may pass through. The light from LED 616 for example would be emitted in the direction shown by arrows 16a and 16b.

The motor driven system may or may not be a stepper motor, such as motor 650, as it could be some other kind of motor. A motor driven system could drive the aperture plate 640 in relation to the LED mounting substrate 610 from the outside by means of a ring gear surrounding the aperture plate 640. The aperture plate 640 could remain fixed while the LED mounting substrate 610 is driven with a motor in various ways.

Figure 8:
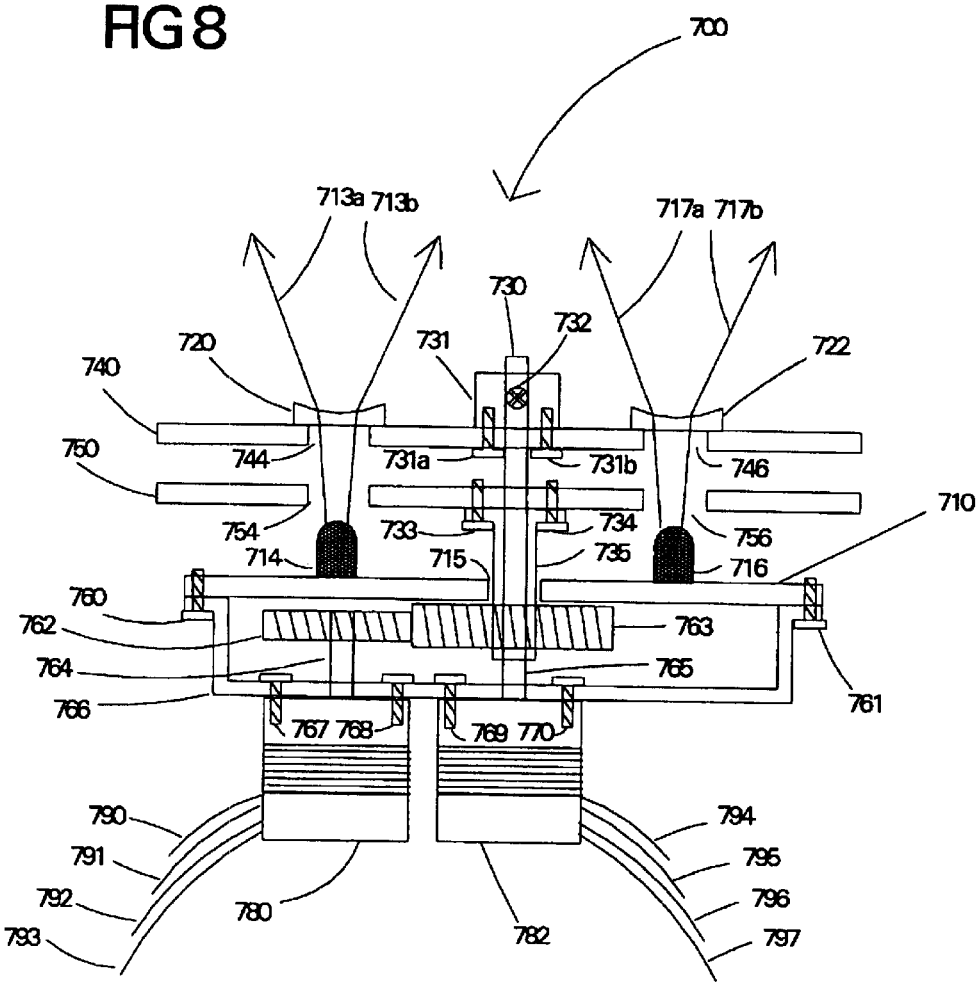
FIG. 8 illustrates an embodiment which is a combination of some of the previous embodiments of the present invention wherein the aperture plate used with the device of FIG. 2A is shown operating on a coaxial system with the aperture plate of FIG. 5A, and in this embodiment both aperture plates are capable of altering the light beam produced by the LED mounting substrate similar to the one shown in FIG. 1A. Two motors and a geared system for operation are shown.

FIG. 8 illustrates an embodiment which is a combination of some of the previous embodiments of the present invention wherein an aperture plate 750 (similar to aperture 40 of FIG. 1C) is shown operating on a coaxial system with an aperture plate 740 (similar to of the aperture plate 40 with lenses shown in FIG. 5A), and in this embodiment, both aperture plates 740 and 750 are capable of altering the light beam produced by the LEDs 714 and 716 on the mounting substrate 710. The aperture plate 740 has attached to it lenses 720 and 722 which cover apertures 744 and 746 respectively. The aperture plate 750 has openings 754 and 756.

The aperture plate 740 is mounted to hub 731 by screws 731a and 731b. The hub 731 is mounted to a shaft 730 by set screw 732. The coaxial shaft 735 is rotatably mounted to aperture plate 750 by screws 733 and 734. The shaft 730 is rotatably mounted to a stepper motor 782. The stepper motor 782 is mounted to a housing 766 by screws 769 and 770. Another stepper motor 780 is mounted to housing 766 by screws 767 and 768. Stepper motor 780 controls the rotation of coaxial shaft 735. Shafts 730 and 735 can be rotated independently of one another and are not connected together. Stepper motor 780 has conductors 790–793 which apply power. Different stepper motor types have different numbers of conductor wires and four conductors 790–793 are only shown as an example. A shaft 764 is rotatably connected to stepper motor 782. A gear 762 is connected to the shaft 764. A gear 762 interacts with the gear 763 which is connected to a coaxial shaft 735. The coaxial shaft 735 has a mounting flange that is used to couple the aperture plate 750 by means of screws 733 and 734. The housing 766 is mounted to the substrate 710 by the screws 760 and 761.

Each aperture plate 740 and 750 is centrally located over the LED mounting substrate 710. The top aperture plate 740 (in conjunction with lenses 720 and 722) when rotated to the correct position is capable of altering the projected light beams (which in FIG. 8 are currently shown pointing in direction 713a and 713b from LED 714 and 717a and 717b from LED 716) produced by the LED's by using the beam-modifying optics. Although only two LEDs 714 and 716 are shown mounted to the mounting plate 710, a much greater number of LEDs may be mounted to the substrate 710. Also the aperture plate 750 is shown with through hole apertures or openings 754 and 756 but other strategically placed apertures may be provided which include color filters. Generally, aperture plates 740 and 750 show only two apertures each (744 and 746 for plate 740 and 754 and 756 for plate 750), however, each may have a greater number of apertures not shown.

FIG. 8 shows the use of two aperture plates 740 and 750 to alter the beam of a plurality of LEDs, however, three or more aperture plates used to sequentially modify color may be used. Coaxial drive systems like that shown in FIG. 8 may be expanded upon to drive three or more aperture plates. When a plurality of aperture plates are incorporated into the beam altering mechanism, several parameters of the light beam projected by the LEDs may be varied. For example in FIG. 8 aperture plate 750 may be an aperture plate for modifying color such as described in FIG. 2A, FIG. 3B, or FIG. 4B. In FIG. 8 aperture plate 740 may be an aperture plate with beam modifying optics such as that described in FIG. 5A, FIG. 5B or FIG. 5C.

Beam modifying optics are used to alter the focus of the light beam projected by the LEDs (such as LEDs 714 and 716 in FIG. 8). For example in FIG. 1B arrows 19a and 19b show the direction of the projected light from LED 18. In FIG. 5A arrows 319a and 319b show the direction of light projected from LED 18 after passing through the beam modifying optics incorporated into aperture plate 40. In the beam altering mechanism shown in FIG. 8 both color and focus of the light beam projected by the plurality of LEDs (such as LEDs 714 and 716) may be modified.

It may be an advantage to produce a beam altering mechanism for the plurality of LEDs that incorporates two or more aperture plates. For example a first color modifying aperture plate could be used with a second color modifying aperture plate to further modify colors that have been selected by the first aperture plate. By using several color modifying aperture plates with the beam altering mechanism a large assortment of colors can be created.

Just as it may be an advantage to use two or more color modifying aperture plates with the beam altering mechanism it can be an advantage to use two or more aperture plates containing beam modifying optics. When incorporating two or more aperture plates containing beam modifying optics the first aperture plate may be selected to modify the projected light by the plurality of LEDs is such a way as to widen the angle of the light projected by the LEDs. Next a second aperture plate containing beam modifying optics may create a second modification to the light projected by the LEDs as to further widen the focus of the LEDs. As shown in FIG. 5C it is possible that the second aperture plate containing the beam modifying optics may contain lenticular lenses 402, 404, 406, 408. In this way the light projected by the plurality of LEDs might first pass though the first aperture plate containing beam modifying optics and have the focus widened and next the light projected by the plurality of LEDs would next pass through the beam modifying optics of the second aperture plate that may be selected to further modify the beam with the lenticular beam modifying optics. Beam altering mechanisms for a plurality of light sources may use many combinations of color modifying aperture plates and beam modifying optical aperture plates. It is possible to incorporate both color modifying and beam modifying optics in a single aperture plate. For example in FIG. 2A the color modifying filters 44a, 54a, 64a, and 74a located over the strategically placed apertures 44, 54, 65, and 74 could be substituted for the beam modifying optics like that shown in FIG. 5A 304, 306, and 308.

In operation, the motor 780 controls rotation of the aperture plate 750 through the gear 762, gear 763, and the coaxial shaft 735. The motor 782 controls rotation of the aperture plate 740 through the shaft 730 (connected at the end identified as 765). The shaft 765 passes through the coaxial shaft 735 as the coaxial shaft acts like a bushing and allows shaft 765 to pass through freely. The gear 763 has a hole in it and is pressed onto the outside of coaxial shaft 735. The aperture plates 750 and 740 are thus independently controllable and ratable. The gear 763 is fitted to the outside of coaxial shaft 735 and has a hole in it for the shaft 735. The gear 763 may be pressed onto the outside of the coaxial shaft 735 or it may be fixed in other ways. The LED mounting plate 710 has the through hole 715 shown in FIG. 8. The aperture plates 750 and 740 are thus independently controllable and rotatable.

The motors would have their own through holes in mounting plate 766 and these are not shown for simplification.

Figure 9:
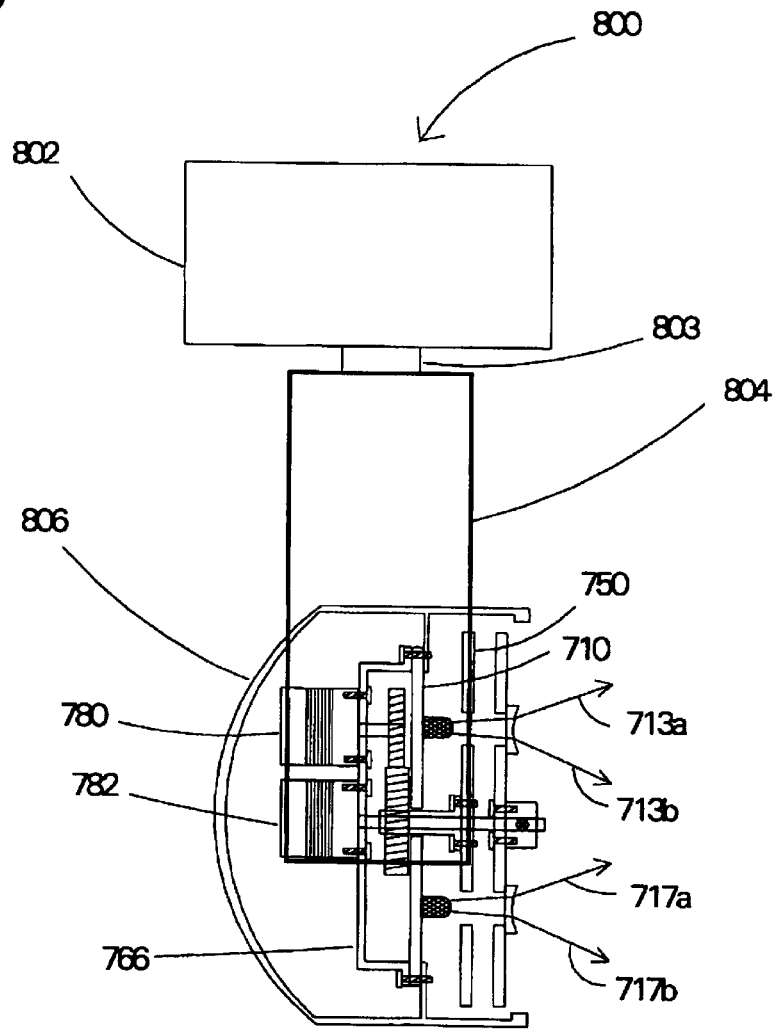
FIG. 9 illustrates a multi-parameter light incorporating the device illustrated in FIG. 8.

FIG. 9 illustrates a multi-parameter light 800 incorporating the device 700 of FIG. 8. The multi-parameter light includes electronic housing 802, bearing arrangement 803, yoke 804, and lamp housing 806. Disregarding device 700, the housing 802, bearing arrangement 803, yoke 804 and lamp housing 806 are known in the art.

There would also be bearing arrangements between the yoke and the lamp housing that is not shown for simplification purposes.

FIG. 10A illustrates a masking plate 900. The masking plate 900 includes apertures 902, 904, 906, and 908, as well as hole 910.

The masking plate 900 is designed to work with an LED mounting substrate, such as substrate 30 of FIG. 1A. The preferred mask is stationary and is used to block stray light that may be emitted by the LEDs, such as 12, 14, 16, and 18, mounted to the LED mounting substrate, such as 30, that is not desired to pass through the aperture mask apertures 902, 904, 906, and 908. The mask 900 may be fixed to the LED mounting substrate 30 in a non-movable manner.

FIG. 10B illustrates the masking plate 900 of FIG. 10A incorporated into a device similar to that show in FIG. 2B. FIG. 10A shows masking plate 900 having apertures 904, 906 and 908 and also shows aperture plate 40, described in FIG. 1C. Also shown in FIG. 10B is substrate 30 previously described in FIG. 1A. FIG. 10 also shows lines with arrows 914a–b, 916a–b, and 918a–b which show the expected direction of light from LEDs 14, 16, and 18 respectively.

The masking plate 900 has one set of apertures strategically aligned with the LED mounting substrate 30. The masking plate 900 allows only the desired projected light beam from the LEDs to pass through the aperture mask 900. This would reduce the amount of stray light that might inadvertently pass through the non-selected apertures in the aperture plate 900 used above. The masking plate 900 might be manufactured of any opaque material that will sufficiently block the stray light while having strategically place optimally sized apertures (for apertures 902, 904, 906, and 908) that allow the desired projected light from the LEDs (12, 14, 16, and 18) to pass through the masking plate 900.

FIGS. 10C and 10D illustrate how the masking plate 900 works. FIG. 10C shows an LED 14 emitting projected light (without any aperture plates or filters) The solid lines with arrows 944a and 944b indicate the light projected from the light source 14 as was intended by design. The dotted lines with arrows 954a and 954b show the light emission that was not intended by design. Many light sources project light in a designed beam angle. It is known in the art that light sources that have been designed to project light at a certain angle often project some light at undesired angles other that the desired angle.

FIG. 10D shows a section of a masking plate 1000 used in conjunction with the LED 14 of FIG. 10C and an aperture plate 1040. The aperture 1015 shown in the masking plate 1000 has been designed to allow only the desired angle of light from the LED 14 (i.e. when emitted in directions 944a and 944b) to pass while rejecting unwanted light that is emitted at angles over the desired angle (i.e. when emitted in directions 954a and 954b). The masking plate 1000 can be used with a plurality of light sources alone or it can be used in conjunction with aperture plates 1040 as shown in FIG. 10D. The masking plate 1000 could be mounted after the aperture plate 1040 (i.e. the reverse of FIG. 10D) but is it preferred to reject the unwanted light before passing the remaining light through an aperture plate, such as 1040. Various designs of apertures (i.e. in the location of apertures 1015 and 1045) in the masking plate 1040 or the aperture plate 1040 can be used such as round, oblong, square for rejecting unwanted light.

It is important to remember that the apertures in the aperture plate, such as plate 40, are defined as locations in the aperture plate 40 where the projected light beam from a specific LED (such as for example LED 14) passes through "generally" unobstructed, through an optical color filter, through light refractive optics and or through a diffusion material. Each LED, such as for example LED 14, may have from two to four or more apertures strategically located in the aperture plate, such as 40. The LED's (such as 12, 14,16, and 18) may emit a more narrow wavelength or combined wavelength than broad-spectrum visible white. It is still advantageous to alter the color or focus of the projected light.

The aperture plate of FIG. 3A shows slotted apertures or continuous apertures 102, 104, 106, and 108. FIG. 3B and FIG. 4B both have these same slotted or continuous apertures 102, 104, 106, and 108. As an example, the slotted or continuous aperture 102 of FIG. 3B is effectively equivalent to the apertures 76, 74, of 72 of FIG. 1C. The advantage of the slotted or continuous aperture 102 (and the other apertures 104, 106, and 108) of FIG. 3B is that the sections between the apertures 76 to 74 and 74 to 72 of FIG. 1C have been removed to allow a more uninterrupted selection of color.

Various modifications to the orientation of the aperture plate, such as 40 to the LED mounting substrate, such as 30, may be used. For instance it is possible to slide an aperture plate across the LED mounting substrate and thus align new apertures strategically with the LEDs on the LED mounting substrate. The aperture plate may be fixed while the LED mounted substrate is moved to position the LEDs on the mounting substrate strategically with the apertures on the aperture plate.

It may be of an advantage to include an aperture mask between the LED mounting substrate and the aperture plate.

The LED's illustrated are of one type of physical construction. The invention should not be limited to the physical construction of the LED's illustrated. There are other types of LED construction that are known in the art. For example there are surface mount LEDs that may not include a collimating lens in the package and LEDs with external reflectors that direct the projected light as known in the art.

The substrate that the LEDs are mounted on may be a circuit board that may also conduct the power to the LEDs. The substrate that the LED's are mounted on may be a heat sink that helps to remove heat from the LED while a separate circuit board or conductors provide power to the LEDs. Various types of material as known in the art could be used for the LED mounting substrate. Each LED such as LEDs 12, 14, 16, and 18 in FIG. 1A could be replaced by a group of LEDS or light sources that effectively acts as one light source. For example LED 12 may be replaced by a plurality of LEDS. A light source, in the present application, may include a plurality or group of light sources effectively functioning or grouped together as one light source.

Figure 11A:
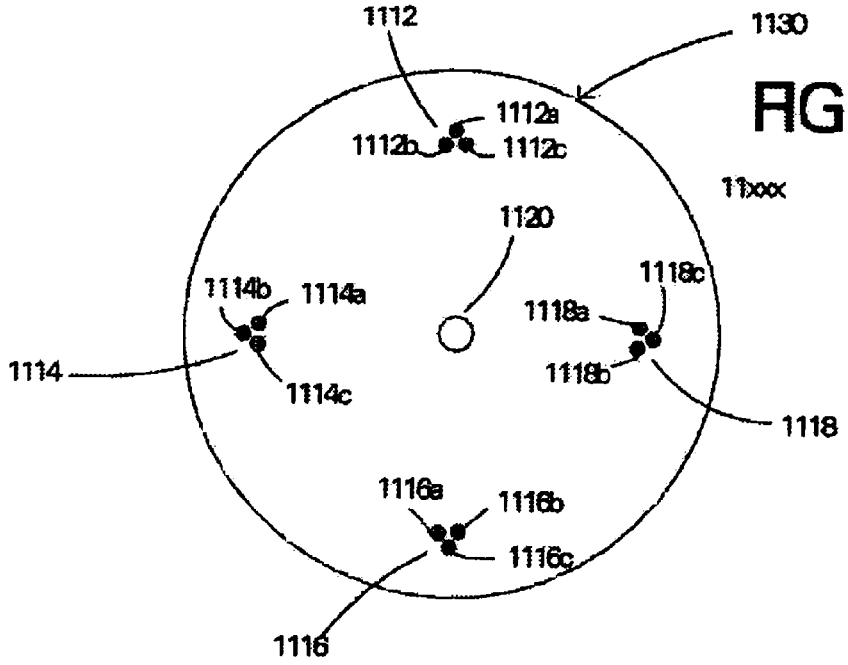
FIG. 11A shows a top planar view of a substrate with light sources in groups in accordance with another embodiment of the present invention.

FIG. 11A illustrates a top planar view of a mounting substrate 1130 with LED groups 1112, 1114, 1116, and 1118 mounted on the substrate 1130 in a symmetrical fashion. Each LED group in FIG. 11A includes three LEDs. LED groups 1112, 1114, 1116, and 1118 include LEDs 1112a–c, 1114a–c, 1116a–c, and 1118a–c, respectively. Each group of LEDs effectively functions as a single light source. The substrate 1130 includes a central mounting hole 1120 at the center of the substrate 1130. The substrate 1130 can be circular in shape as shown. The substrate 1130 may be similar to the substrate 30 of FIG. 1A and the LEDS of LEDs 1112a–c, 1114a–c, 1116a–c, and 1118a–c may be similar to LEDs 12, 14, 16, and 18 in FIG. 1A.

Figure 11B:
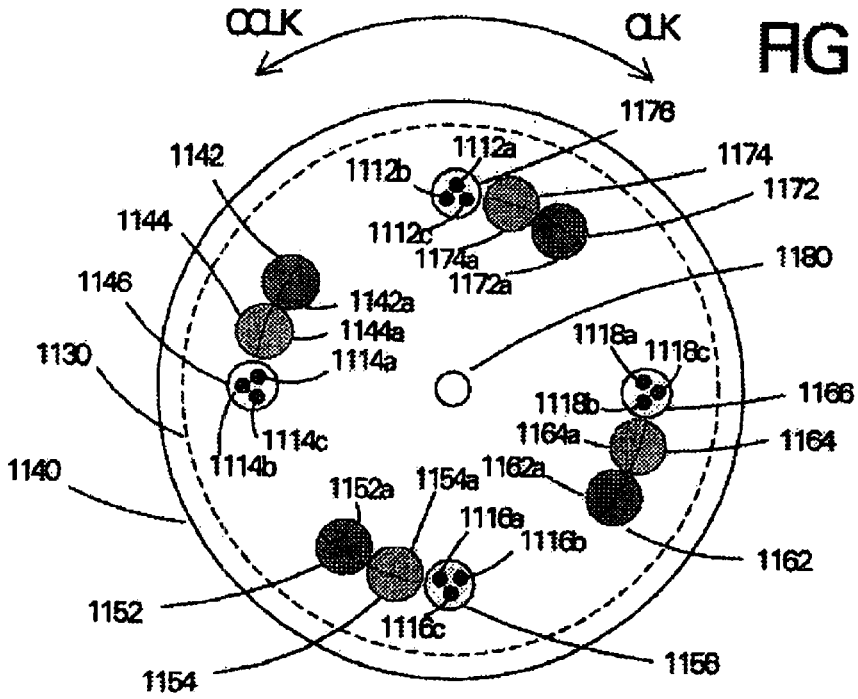
FIG. 11B shows a top planar view of an aperture device mounted centrally over the substrate of FIG. 11A.

FIG. 11B shows an aperture device 1140 mounted centrally over the substrate 1130 of FIG. 11A. FIG. 11B also shows color filters 1142a, 1144a, 1152a, 1154a, 1162a, 1164a, 1172a, and 1174a which may be attached to the aperture device or plate 1140 and mounted over strategically placed apertures 1142,1144, 1152, 1154, 1162, 1164, 1172, and 1174, respectively. FIG. 11B shows apertures 1146, 1156, 1166, and 1176 directly over LED groups 1112, 1114, 1116 and 1118, respectively. The aperture device 1140 may have a center pin or hole 1180. The aperture device 1140 and mounting substrate 1130 of FIGS. 1 A–B may be similar to that shown in FIG. 2A except for the groups of LEDs 1112, 1114, 1116, and 1118 as opposed to the individual LEDs 12, 14, 16, and 18. The aperture device 1140 may also be interchanged for other aperture devices such as aperture device 100 of FIG. 3A, aperture device 400 of FIGS. 5B and 5C, and aperture device 504 of FIG. 6. The aperture plate or aperture device 1140 along with the color filters and/or beam modifying optics of FIG. 11B may be replaced with the aperture plates or aperture devices, color filters and beam modifying optics shown in FIGS. 3B, 4B, FIG. 5A, 5B, 5C, and FIG. 6.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising a mounting substrate having a first light source and a second light source mounted thereon;

a first aperture device having a first aperture and a second aperture;

wherein the first aperture device can be aligned over the mounting substrate so that light from the first light source is emitted through the first aperture of the first aperture device and light from the second light source is emitted through the second aperture of the first aperture device; and wherein the first aperture device is [adjustably mounted to the mounting substrate] *adjustable* so that the first aperture device can [move] *be aligned* with respect to the mounting substrate; and the first aperture device is aligned with the mounting substrate to allow the emission of light from the first light source through the first aperture of the first aperture device and light from the second light source through the second aperture of the first aperture device by [moving] *aligning* the first aperture device with respect to the mounting substrate.

2. The apparatus of claim 1 further comprising a second aperture device having a first aperture and a second aperture;

wherein the second aperture device can be aligned over the first aperture device so that light from the first light source is emitted through the first aperture of the first aperture device and then through the first aperture of the second aperture device;

and light from the second light source is emitted through the second aperture of the first aperture device and then through the second aperture of the second aperture device.

3. The apparatus of claim 1 wherein the first light source is a light emitting diode; and the second light source is a light emitting diode.

4. The apparatus of claim 1 wherein the first aperture device can be aligned over the mounting substrate so that the first aperture of the first aperture device is coaxially aligned over the first light source;

and the second aperture of the first aperture device is coaxially aligned over the second light source.

5. The apparatus of claim 1 wherein the first aperture device is comprised of a third aperture and a fourth aperture; and wherein the first aperture device can be aligned over the mounting substrate so that light from the first light source is emitted through the third aperture of the first aperture device and light from the second light source is emitted through the fourth aperture of the first aperture device.

6. The apparatus of claim 1 wherein the first aperture device is comprised of an aperture plate which includes the first and second apertures.

7. The apparatus of claim 6 wherein the aperture plate of the first aperture device is round.

8. The apparatus of claim 1 wherein the first aperture device is mounted centrally over the mounting substrate.

9. The aperture of claim 8 wherein the first aperture device is rotatably mounted to the mounting substrate; and the first aperture device is aligned with the mounting substrate to allow the emission of light from the first light source through the first aperture of the first aperture device and light from the second light source through the second aperture of the first aperture device by rotating the first aperture device with respect to the mounting substrate.

10. The apparatus of claim 1 wherein each of the light sources each emits broad-spectrum visible white light.

11. The apparatus of claim 3 wherein each of the light emitting diodes emits broad-spectrum visible white light.

12. The apparatus of claim 1 wherein the first aperture device is comprised of a transparent material.

13. The apparatus of claim 6 wherein the aperture plate of the first aperture device is comprised of a transparent material.

14. The apparatus of claim 3 comprising a multi-parameter lighting device; and wherein the substrate and the first aperture device are part of the multi-parameter lighting device.

15. The apparatus of claim 3 comprising a multi-parameter lighting device; and wherein the substrate, the first aperture device, and the second aperture device are part of the multi-parameter lighting device.

16. The apparatus of claim 14 and wherein the multi-parameter lighting device includes a communications address.

17. An apparatus comprising a mounting substrate having a first light source and a second light source mounted thereon;

a first aperture device having a first aperture and a second aperture;

wherein the first aperture device can be aligned over the mounting substrate so that light from the first light source is emitted through the first aperture of the first aperture device and light from the second light source is emitted through the second aperture of the first aperture device further comprising a flashlight; and wherein the mounting substrate and the first aperture device are part of the flashlight.

18. An apparatus comprising a mounting substrate having a first light source and a second light source mounted thereon;

a first aperture device having a first aperture and a second aperture;

wherein the first aperture device can be aligned over the mounting substrate so that light from the first light source is emitted through the first aperture of the first aperture device and light from the second light source is emitted through the second aperture of the first aperture device; and further comprising a masking device which prevents light from the first light source and the second light source from passing through the masking device if the light is emitted in a first direction.

19. The apparatus of claim 1 wherein the first aperture device includes a first color filter [covering] *at a location of* the first aperture and a second color filter [covering] *at a location of* the second aperture;

wherein the first aperture device can be aligned over the mounting substrate so that light from the first light source is emitted through the first color filter and the first aperture of the first aperture device and light from the second light source is emitted through the second color filter and the second aperture of the first aperture device.

20. The apparatus of claim 19 wherein the first color filter and the second color filter filter substantially the same frequency.

21. An apparatus comprising a mounting substrate having a first light source and a second light source mounted thereon;

a first aperture device having a first aperture and a second aperture;

wherein the first aperture device can be aligned over the mounting substrate so that light from the first light source is emitted through the first aperture of the first aperture device and light from the second light source is emitted through the second aperture of the first aperture device;

wherein the first aperture device is mounted over the mounting substrate; and further comprising a first color filter covering the first aperture of the first aperture device;

a second color filter covering the second aperture of the first aperture device;

a third color filter covering the third aperture of the first aperture device; and a fourth color filter covering the fourth aperture of the first aperture device;

wherein the first aperture device can be aligned over the mounting substrate in a first position so that light from the first light source is emitted through the first color filter and the first aperture of the first aperture device and light from the second light source is emitted through the second color filter and the second aperture of the first aperture device;

and wherein the first aperture device can be aligned over the mounting substrate in a second position so that light from the first light source is emitted through the third color filter and the third aperture of the first aperture device and light from the second light source is emitted through the fourth color filter and the fourth aperture of the first aperture device.

22. The apparatus of claim 21 wherein the first and second color filters filter substantially the same frequency;

and the third and fourth color filters filter substantially the same frequency.

23. The apparatus of claim 1 further comprising a first light refractive optic [covering] *as* the first aperture of the first aperture device;

a second light refractive optic [covering] *as* the second aperture of the first aperture device;

wherein the first aperture device can be aligned over the mounting substrate so that light from the first light source is emitted through the first light refractive optic and the first aperture of the first aperture device and light from the second light source is emitted through the second light refractive optic and the second aperture of the first aperture device.

24. The apparatus of claim 23 wherein the first light refractive optic and the second light refractive optic filter have substantially the same optical power.

25. The apparatus of claim 7 wherein a first light refractive optic covering the first aperture of the first aperture device;

a second light refractive optic covering the second aperture of the first aperture device;

a third light refractive optic covering the third aperture of the first aperture device; and a fourth light refractive optic covering the fourth aperture of the first aperture device;

wherein the first aperture device can be aligned over the mounting substrate in a first position so that light from the first light source is emitted through the first light refractive optic and the first aperture of the first aperture device and light from the second light source is emitted through the second light refractive optic and the second aperture of the first aperture device;

and wherein the first aperture device can be aligned over the mounting substrate in a second position so that light from the first light source is emitted through the third light refractive optic and the third aperture of the first aperture device and light from the second light source is emitted through the fourth light refractive optic and the fourth aperture of the first aperture device.

26. The apparatus of claim 25 wherein the first and second light refractive optics filter have substantially the same optical power;

and the third and fourth light refractive optics filter have substantially the same optical power.

27. The apparatus of claim 1 wherein the first aperture is a slotted aperture; and the second aperture is a slotted aperture.

28. The apparatus of claim 6 wherein the first aperture and the third aperture are contained with a first slotted aperture;

and the second aperture and the fourth aperture are contained with a second slotted aperture.

29. The apparatus of claim 1 wherein the first light source is comprised of a first group of light sources;

and the second light source is comprised of a second group of light sources.

30. The apparatus of claim 29 wherein the first group of light sources is comprised of a first group of light emitting diodes;

the second group of light sources is comprised of a second group of light emitting diodes.

31. The apparatus of claim 19 herein the first aperture device includes a third aperture and a fourth aperture;

wherein the third aperture permits light to pass through the third aperture and the first aperture device unfiltered;

wherein the fourth aperture permits light to pass through the fourth aperture and the first aperture device unfiltered;

wherein the first and third apertures are adjacent one another and the second and fourth apertures are adjacent one another.

32. The apparatus of claim 1 wherein the first aperture device includes a first variable density filter covering the first aperture and a second variable density filter covering the second aperture;

wherein the first aperture device can be aligned over the mounting substrate so that light from the first light source is emitted through the first variable density filter and the first aperture of the first aperture device and light from the second light source is emitted through the second variable density filter and the second aperture of the first aperture device.

*33. An apparatus comprising*

*a first light emitting diode light source and a second light emitting diode light source;*

*a first aperture and a second aperture;*

*wherein the first aperture can be aligned to a first position over the first light emitting diode light source so that light from the first light emitting diode light source is emitted through the first aperture;*

*wherein the second aperture can be aligned to a second position over the second light emitting diode light source so that light from the second light emitting diode light source is emitted through the second aperture;*

*and wherein the alignment of the first position and the second position happen substantially simultaneously;*

*wherein the first aperture can be aligned to a third position wherein substantially no light from the first light emitting diode light source is emitted through the first aperture;*

*wherein the second aperture can be aligned to a fourth position wherein substantially no light from the second light emitting diode light source is emitted through the second aperture;*

*and wherein the alignment of the third position and the fourth position happen substantially simultaneously.*

*34. The apparatus of claim 33 further comprising*

*a theatrical lighting device; and*

*wherein the first light emitting diode light source, the second light emitting diode light source, the first aperture and the second aperture are components of the theatrical lighting device.*

*35. The apparatus of claim 33 further comprising*

*a first light refractive optic which is a component of the first aperture;*

*and a second light refractive optic which is component of the second aperture.*

*36. The apparatus of claim 35 further comprising*

*a theatrical lighting device; and*

*wherein the first light emitting diode light source, the second light emitting diode light source, the first aperture, the second aperture, the first light refractive optic, and the second light refractive optic are components of the theatrical lighting device.*

*37. The apparatus of claim 33 further comprising*

*a first color filter which is a component of the first aperture;*

*and a second color filter which is a component of the second aperture.*

*38. The apparatus of claim 37 wherein*

*the first color filter is a variable density filter; and*

*the second color filter is a variable density filter.*

*39. The apparatus of claim 37 wherein*

*the first light emitting diode light source and the second light emitting diode light source emit visible broad spectrum white light.*

*40. The apparatus of claim 38 further comprising*

*a theatrical lighting device; and*

*wherein the first light emitting diode light source, the second light emitting diode light source, the first aperture, the second aperture, the first color filter, and the second color filter are components of the theatrical lighting device.*

*41. The apparatus of claim 33 further comprising*

*an aperture device comprised of a transparent material; and*

*wherein the first aperture and the second aperture are components of the aperture device.*

*42. A multiparameter theatre lighting device comprising:*

*an electronics housing;*

*a yoke; and*

*a lamp housing;*

*wherein the lamp housing comprises*

*a first light emitting diode light source and a second light emitting diode light source;*

*a first aperture and a second aperture;*

*wherein the first aperture can be aligned to a first position over the first light emitting diode light source so that light from the first light emitting diode light source is emitted through the first aperture;*

*wherein the second aperture can be aligned to a second position over the second light emitting diode light source so that light from the second light emitting diode light source is emitted through the second aperture;*

*and wherein the alignment of the first position and the second position happen substantially simultaneously*

*wherein the first aperture can be aligned to a third position wherein substantially no light from the first light emitting diode light source is emitted through the first aperture.*

*43. The multi-parameter theatre lighting device of claim 42 wherein*

*the first aperture can be aligned to a third position wherein substantially no light from the first light emitting diode light source is emitted through the first aperture;*

*wherein the second aperture can be aligned to a fourth position wherein substantially no light from the second light emitting diode light source is emitted through the second aperture;*

*and wherein the alignment of the third position and the fourth position happen substantially simultaneously.*

*44. An apparatus comprising*

*a first light emitting diode light source;*

*a second light emitting diode light source;*

*a first light refracting optic;*

*and a second light refracting optic;*

*wherein the first light refracting optic can be aligned to a first position over the first light emitting diode light source so that light from the first light emitting diode light source is emitted through the first light refracting optic;*

*wherein the second light refracting optic can be aligned to a second position over the second light emitting diode light source so that light from the second light emitting diode light source is emitted through the second light refracting optic;*

*and wherein the alignment of the first position and the second position happen substantially simultaneously.*

*45. The apparatus of claim 44 further comprising*

*a third light refracting optic;*

*and a fourth light refracting optic; and*

*wherein the third light refracting optic can be aligned to a third position over the first light emitting diode light source so that light from the first light emitting diode light source is emitted through the third light refracting optic;*

*wherein the fourth light refracting optic can be aligned to a fourth position over the second light emitting diode light source so that light from the second light emitting diode light source is emitted through the fourth light refracting optic;*

*and wherein the alignment of the third position and the fourth position happen substantially simultaneously.*

*46. The apparatus of claim 45 wherein*

*the first light refractive optic and the second light refractive optic are of different light refractive types than the third light refractive optic and the fourth light refractive optic.*

*47. The apparatus of claim 44 wherein*

*the apparatus is a flashlight.*

*48. The apparatus of claim 44 wherein*

*the apparatus is a multi-parameter theatre lighting device.*

*49. A multi-parameter theatre lighting device comprising:*

*an electronics housing;*

*a yoke; and*

*a lamp housing;*

*wherein the lamp housing comprises*

*a first light emitting diode light source and a second light emitting diode light source;*

*a first light refractive optic and a second light refractive optic;*

*wherein the first light refractive optic can be aligned to a first position over the first light emitting diode light source so that light from the first light emitting diode light source is emitted through the first light refractive optic;*

*wherein the second light refractive optic can be aligned to a second position over the second light emitting diode light source so that light from the second light emitting diode light source is emitted through the second light refractive optic;*

*and wherein the alignment of the first light refractive optic and the second light refractive optic happen substantially simultaneously.*

*50. A multi-parameter theatre lighting device comprising:*

*an electronics housing;*

*a yoke; and*

*a lamp housing;*

*wherein the lamp housing comprises*

*a first light emitting diode light source and a second light emitting diode light source;*

*a first color filter and a second color filter;*

*wherein the first color filter can be aligned to a first position over the first light emitting diode light source so that light from the first light emitting diode light source is emitted through the first color filter;*

*wherein the second color filter can be aligned to a second position over the second light emitting diode light source so that light from the second light emitting diode light source is emitted through the second color filter;*

*happen substantially simultaneously.*

*51. A multi-parameter theatre lighting device comprising:*

*an electronics housing;*

*a yoke; and*

*a lamp housing;*

*wherein the lamp housing comprises*

*a first light emitting diode light source and a second light emitting diode light source;*

*a first aperture device comprising a first and second aperture;*

*a second aperture device comprising a third and fourth aperture;*

*wherein light emitted from the first light emitting diode source can be transmitted through the first aperture;*

*wherein light emitted from the second light emitting diode source can be transmitted through the second aperture;*

*wherein light emitted from the first light emitting diode source can be transmitted through the third aperture;*

*wherein light emitted from the second light emitting diode source can be transmitted through the fourth aperture;*

*and wherein at least two of the apertures contain a color filter.*

* * * * *